United States Patent
Anders et al.

(10) Patent No.: US 10,138,074 B2
(45) Date of Patent: Nov. 27, 2018

(54) GROUPING OF GOODS

(71) Applicant: Wipotec Wiege- und Positioniersysteme GmbH, Kaiserslautern (DE)

(72) Inventors: Daniel Anders, Osthofen (DE); Rene Elspass, Winnweiler (DE)

(*) Notice: Subject to any disclaimer, the term of this patent is extended or adjusted under 35 U.S.C. 154(b) by 0 days.

(21) Appl. No.: 15/182,375

(22) Filed: Jun. 14, 2016

(65) Prior Publication Data
US 2016/0362258 A1    Dec. 15, 2016

(30) Foreign Application Priority Data

Jun. 15, 2015 (DE) .................. 10 2015 109 556
Aug. 7, 2015 (DE) .................. 10 2015 113 021

(51) Int. Cl.
| | |
|---|---|
| *B65G 47/32* | (2006.01) |
| *B65G 47/26* | (2006.01) |
| *B65B 35/04* | (2006.01) |
| *B65G 47/08* | (2006.01) |
| *B65G 47/51* | (2006.01) |
| *B65G 47/82* | (2006.01) |

(52) U.S. Cl.
CPC .............. *B65G 47/32* (2013.01); *B65B 35/04* (2013.01); *B65G 47/086* (2013.01); *B65G 47/261* (2013.01); *B65G 47/5109* (2013.01); *B65G 47/82* (2013.01)

(58) Field of Classification Search
CPC .................................................... B65G 47/32
USPC ...... 198/418.5, 419.1, 419.2, 426, 429, 430, 198/437, 456, 460.1, 462.1
See application file for complete search history.

(56) References Cited

U.S. PATENT DOCUMENTS

| | | | |
|---|---|---|---|
| 3,884,361 A | 5/1975 | Botterill | |
| 4,274,780 A | 6/1981 | Kaul et al. | |
| 5,860,504 A * | 1/1999 | Lazzarotti | B07C 1/02 198/349.6 |
| 6,164,045 A | 12/2000 | Focke et al. | |
| 6,503,043 B1 * | 1/2003 | Smith | B65G 65/00 414/331.13 |
| 7,063,206 B2 * | 6/2006 | Haan | B65G 47/261 198/460.3 |

(Continued)

FOREIGN PATENT DOCUMENTS

| | | |
|---|---|---|
| CH | 495874 | 9/1970 |
| EP | 1775221 | 4/2007 |

(Continued)

OTHER PUBLICATIONS

Extended European Search Report dated Nov. 10, 2016, issued in European patent application No. 16174100.4.

(Continued)

*Primary Examiner* — Gene O Crawford
*Assistant Examiner* — Lester Rushin, III
(74) *Attorney, Agent, or Firm* — Knobbe, Martens, Olson & Bear, LLP

(57) ABSTRACT

Embodiments described herein relate to apparatuses and methods for chronological grouping of individual goods, the groups which are formed being displaced one after another out of a first into a second collecting zone in such a way that an oldest group is always displaced as far as a target position which is defined in the second collecting zone.

18 Claims, 2 Drawing Sheets

(56) References Cited

U.S. PATENT DOCUMENTS

| | | | | |
|---|---|---|---|---|
| 8,397,898 B2* | 3/2013 | Buchmann | ......... | B65G 47/5145 |
| | | | | 198/347.4 |
| 9,394,071 B2* | 7/2016 | Yamasita | ................ | B65C 1/021 |
| 9,663,305 B2* | 5/2017 | Papsdorf | .............. | B65G 47/642 |

FOREIGN PATENT DOCUMENTS

| | | |
|---|---|---|
| FR | 2993870 | 1/2014 |
| FR | 2998282 | 5/2014 |
| JP | 2003-335415 | 11/2003 |
| KR | 10-1037315 | 5/2011 |

OTHER PUBLICATIONS

Office Action dated Mar. 7, 2018 for Korean Patent Application No. 10-2016-0073859.

* cited by examiner

GROUPING OF GOODS

CROSS-REFERENCE TO RELATED APPLICATIONS

This application claims priority under 35 U.S.C. § 119(a) to German Patent Application No. 10 2015 109 556.4, filed Jun. 15, 2015, and German Patent Application No. 10 2015 113 021.1, filed Aug. 7, 2015, each of which are hereby incorporated by reference in their entirety.

BACKGROUND

Embodiments discussed herein relate to a method and an apparatus for grouping individual piece goods on a packing table. Grouping operations of this type take place at the end of industrial production lines, in order to package the goods which are manufactured in said production lines into larger containers. Here, the goods are often fed one after another in a serial stream to a first collecting zone, where they are backed up to form individual groups with in each case a defined number of goods. When the group is complete, it is advanced out of the first collecting zone laterally or at a right angle with respect thereto by a fixed amount, in order to make space for building up a new group. The displaced group for its part is then picked up manually and packed, for example, into a box or another packaging. All the goods of the group can expediently be picked up jointly and packed into the packaging, it being possible, for example, for six or 24 groups to be packed depending on the size of the packaging, before the packaging can be closed and sent for dispatch.

This method has the disadvantage that the production has to be slowed down or even stopped if the group which is pushed laterally out of the first collecting zone has not been removed and inserted into the packaging at the latest when the next group has been formed completely in the first collecting zone. Within a relatively short cycle time, the group which is pushed out of the first collecting zone therefore has to be received rapidly, and the operator is bound tightly to the production cycle.

SUMMARY

In one aspect, methods for grouping goods (K) on a packing table (P) are provided, the goods (K) being combined one after another from a serial production stream to form groups (G), by in each case a predefinable number of goods being fed to a first collecting zone (1) in such a way and being kept available there in such a way that the goods lie behind one another in a first direction (X) as a group (Ga), it being intended for the group (Ga) to be considered to be older in comparison with a group to be formed subsequently and to be younger in comparison with a group which has already been formed, each individual group (Ga, Gb . . . ) being displaced directly one after another by a stroke (H) in a second direction (Y) which runs perpendicularly with respect to the first direction (X) into a second collecting zone (2), in order to empty the first collecting zone (1) for forming a new, younger group, each stroke (H) is variable and is selected in such a way that the group (Ga) or the oldest group (Gz) is displaced to a predefinable target position (Ymax) if there was previously no older group there, or that the group (Ga) is pushed as far as its next oldest group (Gb, Gz) if there is already an oldest group (Gz) at the target position (Ymax).

In some embodiments, older group can be displaced indirectly by virtue of the fact that a younger group which adjoins it directly is for its part displaced indirectly or directly. In some embodiments, the width of the goods in the direction (Y) can be detected by at least one suitable sensor (3, 3') and is used to determine the necessary stroke (H). In some embodiments, at least one sensor (7) can monitor the occupation of the end position (Ymax) by a group (Gz). In some embodiments, the displacement of the groups can take place by means of a movable push arm (5), the respective current displacement position of which is detected in the direction (Y).

In some embodiments, during the displacement of the group (Ga) from the first into the second collecting zone, the stroke (H) can be selected to be greater at least by a predefinable amount than the clear width of the goods in the direction (Y). The method as claimed in one of the preceding claims, wherein the maximum number of groups which are to be kept available in the second collecting zone is predefined manually or is determined automatically with consideration of the width of the goods in the direction (Y) and the target position (Ymax). In some embodiments, the maximum number (m) of goods (K) per group can be fixed by way of stipulation of a freely selected value, preferably by manual input into an operating interface of a control unit (6), or by way of automatic determination or manual stipulation of the length of the individual goods (K) in the direction (X) by means of a sensor (4) and determination of the number (m) of lengths of this type which fit on the first collecting zone (1) in the direction (X).

In some embodiments, the second collecting zone (2) can have two collecting regions (B, B') which are separated from one another in the direction (Y) by the first collecting zone (1), each group (Ga, Gb . . . ) which is formed in the first collecting zone (1) optionally being displaced into the first or second collecting region (B, B') by the stroke (H) taking place in the positive or negative direction (Y). In some further embodiments, the groups which are formed in the first collecting zone (1) can always be displaced alternately into the first and second collecting region (B, B'). In other further embodiments, a movable push arm (5), by way of which the groups (G) are displaced, can be positioned, after a group (Gb) has been displaced into the first or second collecting region (B, B'), on that side of the first collecting zone (1) which faces said collecting region at least until the next group (Ga) which is provided for displacement into the other, second or first collecting region is completely assembled in the first collecting zone (1). In other further embodiments, The method as claimed in one of claims 9 to 11, always only so many groups (G) can be collected in both collecting regions (B, B') that a push arm (5) which moves the groups can be moved without displacing a group from one into the other collecting region (B, B').

In one aspect, apparatuses can be provided for carrying out a method as described herein, comprising a packing table with a first collecting zone (1), to which goods (K) can be fed from a serial production stream, in order to arrange them in series in a first direction (X) in the first collecting zone (1) and to combine them to form a group (Ga), and a second collecting zone (2), into which each individual group (Ga, Gb . . . ) can be displaced out of the first collecting zone (1) by way of a stroke (H), in order to empty the first collecting zone (1) for forming a new group, wherein a movable push arm (5) is provided for displacing each group (Ga, Gb . . . ) out of the first collecting zone (1) in the direction (Y) into the second collecting zone, which push arm (5) can be actuated by a control unit (6) to perform a variable stroke (H) in such a way that, after the displacement, the group (Ga, Gb . . . ) assumes a predefined position (Ytemp, Ymax) in the second collecting zone (2).

In some embodiments, the apparatus can further comprise means (3) for the automatic determination of the width of the goods (K) in the direction (Y), in order for it to be possible to take this into consideration during the establishing of the necessary stroke (H). In some embodiments, at least one sensor (7) can be provided for detecting the occupation of the target position (Ymax) in the second collecting zone (2). In some embodiments, the first collecting zone (1) can have a substantially flat surface (F1) for bearing the grouped goods, which flat surface (F1) is flush with a substantially flat surface (F2) of the second collecting zone (2), onto which the groups are displaced, or can be raised or lowered into said flush position by way of relative movement of the two surfaces.

In some embodiments, an automatically acting blocking mechanism (8) can be provided which prevents the further feed of goods into the first collecting zone (1) until a complete group (Ga) which is present there has been displaced into the second collecting zone (2). In some embodiments, the second collecting zone (2) can have two collecting regions (B, B') which are separated from one another in the direction (Y) by way of the first collecting zone (1), it being possible for each group (Ga, Gb . . . ) which is formed in the first collecting zone (1) to be optionally displaced into the first or second collecting region (B, B'), by the stroke (H) taking place in the positive or negative direction (Y). In some further embodiments, the push arm (5) can be moved at a height level which is different from the first collecting zone (1) from the first into the second collecting region (B, B') or back in such a way that a group (Ga) can be assembled in the first collecting zone during this.

DETAILED DESCRIPTION

Figure 1:
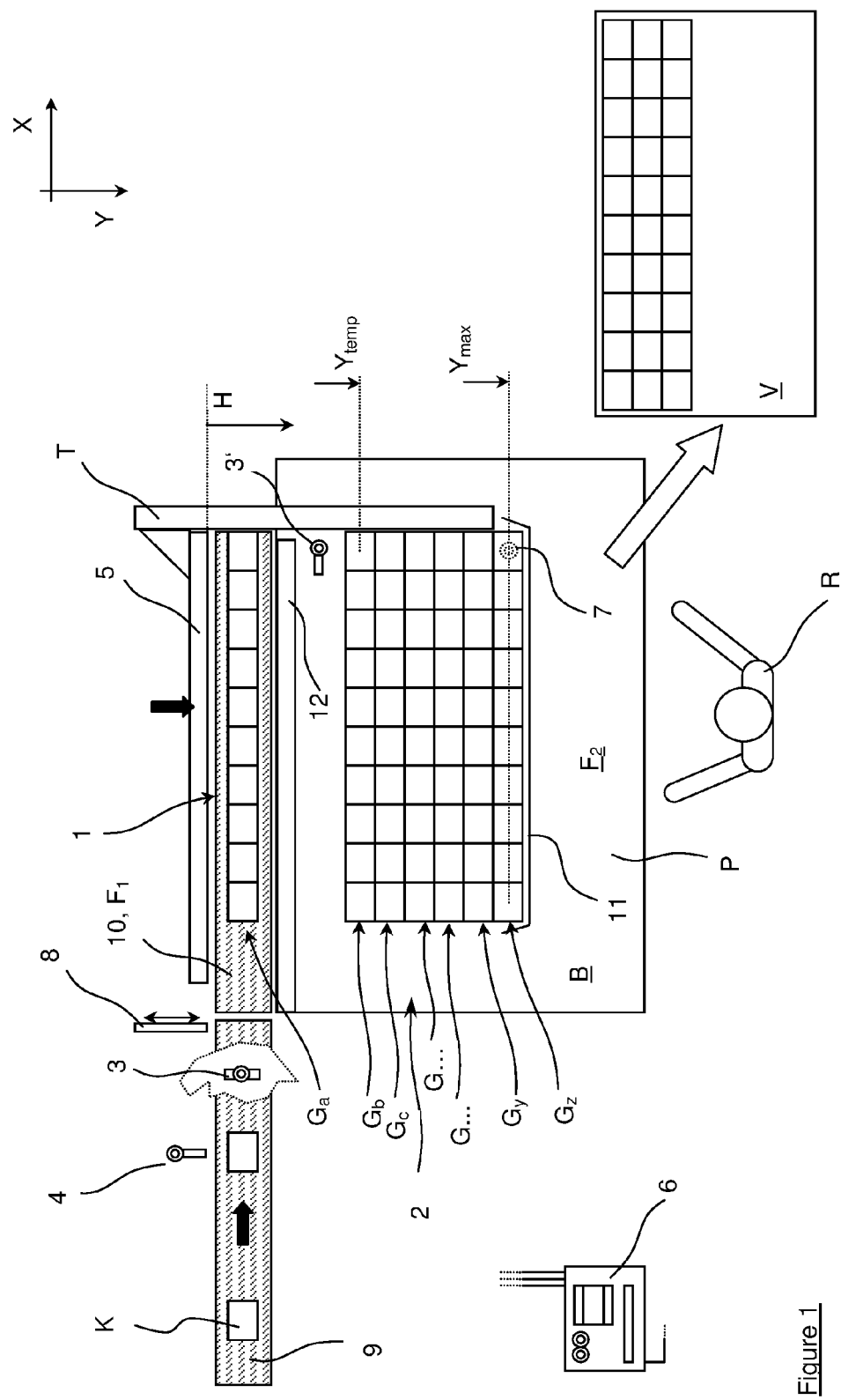
FIG. 1 shows a diagrammatic plan view of the arrangement of a grouping apparatus with only single-sided operation.

In embodiments described herein, a plurality of groups are displaced one after another out of the first collecting zone into the second collecting zone, and the second collecting zone is of sufficiently large dimensions to receive a plurality of groups or rows of goods of this type. Here, a movable push arm displaces the group which was completed in the first collecting zone by a fixed stroke amount perpendicularly with respect thereto on to the second collecting zone and subsequently moves back, in order to proceed in the same way with the next group which is still to be completed. The groups which have already been moved into the second collecting zone during displacement are also displaced here in each case by the constant stroke amount, with the result that a plurality of groups which are adjacent to one another or bear against one another are displaced further in the second collecting zone in each case by a constant stroke amount. This takes place until a foremost or oldest group has reached a predefinable target position in the second collecting zone, and the second collecting zone is therefore considered to be "full". The assembly of further groups and their feeding from the first into the second collecting zone then at the latest has to be stopped.

Although this method provides more storage space and therefore a greater buffer time, within which a group does not have to be received and moved into the packaging, it can disadvantageously be necessary, in order to empty a completely filled second collecting zone again, to raise up some or all of the groups from their respectively different positions and insert them into the packaging. Depending on the working speed of the operator and the push arm and/or the production speed, at which a new group can be formed in the first collecting zone, pack rows or groups have often not yet been advanced sufficiently far in the second collecting zone, with the result that the operator might not be able to pick them up easily. Instead, said operator has to bend over the table to an unergonomically far extent, in order to reach the groups which are present. This leads to rapid fatigue and to health impairment. Moreover, there is the risk, when reaching into the vicinity of the first collecting zone, of passing into the operating path of the push arm, with associated endangering of the operator.

Conversely, at the start of production or in the case of an initially completely emptied second collecting zone, each group is displaced only by a small amount, preferably by the width of the group in the pushing direction. The operator has to wait until the collecting zone is full and the foremost group can be reached satisfactorily by said operator.

It was therefore an object of embodiments described herein to provide a method and an apparatus which overcome the abovementioned disadvantages and make operation which is ergonomically advantageous and unobjectionable in terms of safety of the packing table possible with a storage space which is used in an optimum manner. It is intended that a protective housing of the apparatus can be dispensed with here.

Embodiments of methods described herein are based on the finding of making operation of the packing table possible which is advantageous because it is facilitated, by virtue of the fact that the groups which are provided for packaging are always positioned in the second collecting zone with respect to the operator in such a way that a foremost or oldest group is always positioned in a predefinable target position which is arranged closest to the operator in the second collecting zone, whereas any possible further (and younger) available groups are positioned immediately adjacently and are then jointly displaced further one after another into the target position when the foremost or oldest group has been raised up.

In some methods this principle can be implemented only when the second collecting zone is always completely covered (that is to say, filled) by groups, and the transfer of a newly formed group out of the first collecting zone into the second collecting zone displaces all the groups by the constant stroke dimension in such a way that the next group assumes the target position. This presupposes, however, that the serial inflow of the goods is adapted exactly to the working tempo of the operator, which in turn results in the short cycle times for the operator which have already been mentioned as being disadvantageous.

Embodiments of methods described herein differ from this principle in that it is ensured during each displacement of a group out of the first collecting zone into the second collecting zone that a group is always displaced in the process into the target position which is situated favorably for the operator, to be precise even when the second collecting zone is not occupied completely by groups. This is realized by virtue of the fact that the stroke of the push arm can be set in a variable manner for each individual pushing operation, and depends on whether a group is still available in the target position at the time of the displacement and where the next oldest group is positioned in the second collecting zone. Since the operator always does not have to reach further over the packing table than the target position, in order to lift up a group, there is no risk of being crushed on movable machine components, such as the push arm. The housing for said machine components which is otherwise necessary can therefore also advantageously be dispensed with.

In the following text, "older group" is to be understood to mean that group which was formed temporally before the group respectively under consideration, whereas the "younger" group is to be considered to mean that group which was formed later in relation to the group under consideration. Accordingly, the "next oldest" or "next youngest" group is that group which was formed temporally immediately before the group under consideration or is formed temporally immediately after the group under consideration.

Unlike in some alternative methods, embodiments described herein therefore also permit the case where an oldest group is available in the target position while the space between said target position and the first collecting zone which can be configured to receive a plurality of groups is not completely filled. By way of embodiments described herein, said space is then filled or passed through by the newly formed groups independently of the working speed of the operator, with the requirement of always keeping the oldest group ready in the target position.

If, for example, an oldest group is situated in the target position when the next youngest group is completed in the first collecting zone and is ready for displacement, said group is displaced according to the embodiments described herein only to such an extent into the second collecting zone that it immediately adjoins its preceding, that is to say next oldest, group, without displacing the latter substantially. It is then not absolutely necessary for the operator to remove the oldest group. Instead, said operator can wait until one or more younger groups are formed in the first collecting zone and are displaced into the second collecting zone, as long as said second collecting zone still has space for them. Here, each group is displaced in each case only until it adjoins its next oldest group. An exception to this is formed merely by the case that no group is positioned in the target position before the end of a displacement, for instance because it has been removed by the operator shortly before. In this case, the group which is made available in the first collecting zone is displaced into the second collecting zone to such an extent that it or an older group which is already situated in the second collecting zone is displaced as far as into the target position. The groups which are displaced jointly in this case are displaced by virtue of the fact that the push arm directly loads the youngest group which has just been formed in the first collecting zone on a rear side which faces away from the target position and displaces it in the direction of the target position. Here, the front side of said group which faces the target position comes to lie against the rear side of the next oldest group during the displacement, whereupon the latter is loaded indirectly and from this point is displaced jointly with the next youngest group. In this way, a fundamentally freely selectable number of groups which are adjacent to one another can be displaced jointly.

Embodiments of methods described herein therefore provide that goods are combined from a serial product stream in steps which follow one another in each case to form groups, by in each case a predefinable number of goods being fed to a first collecting zone in such a way and being kept available there in such a way that the goods lie behind one another in a first direction X as a group Ga. Here, the group Ga is considered to be "older" in comparison with each group to be formed subsequently (later) and is considered to be "younger" in comparison with each group (Gb, Gc . . . Gz) which has already been formed previously (earlier).

According to embodiments described herein, each individual group (Ga, Gb . . . Gz) is displaced one after another in a second direction Y which runs perpendicularly with respect to the first direction X into a second collecting zone, in order to empty the first collecting zone for forming a newer, younger group. The displacement takes place by way of a stroke H which is variable according to the embodiments described herein and the value of which can be determined anew for each displacement operation.

When a new group is produced in the first collecting zone, it becomes the "youngest" group Ga, its next oldest group which was previously considered to be the youngest group Ga then becomes the group Gb, etc. Accordingly, all other groups also become older by one "generation". Conversely, a previously oldest group Gz which is removed from the target position loses its status as oldest group. That group which previously, as group Gy, adjoined its next oldest and now removed group is then considered to be the oldest group Gz.

Embodiments of methods described herein can be distinguished by the fact that the variable stroke is selected in such a way:

a) that the group (Ga) or the currently oldest group (Gz) is displaced to a predefinable target position (Ymax) if there was previously no older group there, or b) that the group (Ga) is pushed as far as its next oldest group (Gb, Gz) if there is already an oldest group (Gz) at the target position (Ymax).

One advantageous embodiment of the method provides that the displacement of the groups out of the first collecting zone can take place into two collecting regions of the second collecting zone which lie opposite one another. Here, the first collecting zone, in which the groups are assembled, separates the two collecting regions from one another. Each group which is formed in the first collecting zone can be displaced selectively into the one or other collecting region, that is to say in the positive or negative Y-direction. The packing table then comprises two workstations which lie opposite one another and can both be supplied as required with the groups which are formed in the first collecting zone. Although substantially twice as much storage space for the provision of the finished groups is available as a result of the additional second collecting region, only one push arm is required in an unchanged manner, in order to displace the individual groups onto the one or other side of the first collecting zone, that is to say in the positive or negative Y-direction.

The displacement of the groups which are in each case newly formed in the first collecting zone preferably always takes place alternately into the first and second collecting region. As a result, the next youngest group can advantageously already be formed in the first collecting zone during the displacement of one group, since the push arm, after it has positioned the older group in the first collecting region, loads the next youngest group on the side which faces the first collecting region, in order to feed it to the second collecting region. If the next youngest group has been formed completely in the first collecting zone, the return movement of the push arm after positioning of the older group can be utilized directly to displace said next youngest group into the second collecting region, as a result of which the cycle time is shortened considerably. Unlike in the case of the single-sided positioning of the groups, that is to say which takes place only on one side of the first collecting zone, the push arm therefore does not have to be withdrawn again as far as the other side of the first collecting zone before the displacement of the next group, since it displaces the next group in the other direction, namely into the second collecting region.

Although the alternate displacing of the newly formed groups into the two collecting regions which lie opposite one another is particularly time-saving, this does not have to necessarily take place in this way. In particular, the case can occur where, in the first collecting region, the groups which are provided there are removed more rapidly and inserted into the packaging than is the case in the second collecting region. As a result, the two collecting regions which lie opposite one another have to be supplied with new groups in an irregular sequence which does not strictly alternate. Accordingly, it can be necessary to feed a plurality of groups which follow one another in each case to only one of the two collecting regions, it then being necessary for the push arm to again engage behind the respectively following group, that is to say to move on to the side which faces away from the current collecting region. This can take place automatically and in an optimized manner by way of a suitable controller. To this end, the first and second collecting region are of identical construction and each have sensors for detecting the groups, as will be explained in the following text.

The distinction made in the above text between the older and younger groups is, in so far as the displacement takes place into collecting regions which lie opposite one another, in each case to be understood in relation to the individual collecting region. The "next oldest" group is then considered to be that group which preceded the younger group which is to be displaced next into the same collecting region. A group which is displaced temporarily into the other collecting region does not count as an older or younger group, in relation to the collecting region currently under consideration. Accordingly, the oldest group in a first collecting region can be younger than the oldest group in the second collecting region. It remains the oldest group in relation to its collecting region until it has been removed out of the collecting region. Groups which are temporarily arranged in the other collecting region or are removed from there can be older or younger with regard to their production time in the first collecting zone. This changes nothing about the principle on which the embodiments described herein are based to position the in each case oldest group (in each collecting region) in a defined target position, in order to correspondingly arrange following groups so as to adjoin it, with the result that the available storage area can be utilized or filled as best as possible both in the case of one collecting region and in the case of two collecting regions, while one or more operators can comfortably receive the respectively oldest group from a constantly fixed removal position.

The stroke H also depends on the width in the Y-direction of the individual groups, by which displacement has to be carried out during each displacement operation at least. According to one advantageous embodiment, said width can be detected automatically by way of at least one suitable sensor and can be used for determining the required stroke. Sensors which are known to a person skilled in the art such as light barriers, proximity sensors, etc. are conceivable for this purpose.

Furthermore, a sensor is expediently provided which detects the occupation of the target position by the oldest group in the second collecting zone, in order for it to be possible to determine the required stroke in a manner which is dependent thereon. Here too, this can be, for example, a light barrier which, according to one advantageous embodiment, is let in a flush manner at the target position into the bearing face of the second collecting zone, on which the individual groups are displaced. For moving the push arm by the variable stroke, a further advantageous embodiment provides that the displacement position of the push arm can be detected in the direction Y (for example, using an encoder) and can be evaluated by way of a suitable control unit, in order for it to be possible to position the push arm accurately and/or to detect its position in the Y-direction exactly.

It is provided according to a further advantageous embodiment that the displacement of a group out of the first collecting zone into the second collecting zone exceeds the width of the group in the Y-direction by a predefinable amount. This serves to reliably make the formation of a new group in the first collecting zone possible and not to be blocked by the fact that the next oldest group has previously not been pushed out of the first collecting zone into the second collecting zone to a sufficiently far extent. This can also be necessary, furthermore, when the first collecting zone is at a certain spacing from the second collecting zone for structural reasons, over which spacing the push arm has to displace the groups in each case.

The maximum number of groups which can be held ready in the second collecting zone depends on the target position which is at a predefinable spacing from the first collecting zone, in conjunction with the respective width of the individual groups in the Y-direction. According to one embodiment, this number can be determined automatically and can be taken into consideration in the control of the push arm. With a knowledge of the target position and/or its spacing from the push arm which is withdrawn as far as into the first collecting zone and as a result of the above-described automatic detection of the group width, the storage space which is available in the second collecting zone can thus be determined automatically and can be utilized in an optimum manner.

As an alternative, it is also conceivable, however, to stipulate the maximum number of groups to be positioned in the collecting zone manually or by way of a signal which is fed to the control unit externally, with a value below the maximum possible number. In this case, a new displacement operation would be suppressed when, although there would still be sufficient space in the second collecting zone for the group to be displaced, the predefined number of groups has already been reached there.

In the context of this application, the term "group" is preferably to be understood such that a number of individual goods are arranged linearly behind one another in a direction X, with the result that a group consists of a line of, for example, 5 or 10 goods. Embodiments described herein are not restricted, however, to an understanding of this type of "group". Rather, it is likewise conceivable to define "group" in such a way that it consists of a plurality of lines of goods. In particular, it is conceivable to form said groups from a plurality of production lines, each production line contributing one line. A group having a plurality of lines can also be formed from a single production line, which lines are then arranged adjacently with respect to one another in the Y-direction in the first collecting zone. A group is not defined by the number of lines of goods, from which it is formed, but rather by the circumstance that the goods which are moved out of the first collecting zone into the second collecting zone in a common displacement operation are to be considered to be a group.

Furthermore, although certain embodiments described herein assume that the group comprises a plurality of goods in the X-direction, that is to say behind one another, this is not absolutely necessary for other embodiments. Rather, a group can also consist of only a single good or even, in a continuation of the above embodiments, of a plurality of lines with only in each case one good therein. Finally, a single good can also denote a pre-grouped arrangement of individual elements, with the result that a good already represents a packaging unit of a plurality of individual elements. For example, individual packs, folding boxes or bundles are also to be included in this.

According to one advantageous embodiment of the method, the maximum number m of goods per group is fixed by stipulation of a freely selectable value, preferably by manual input into an operating interface of a control unit. Thus, in particular in a manner which is dependent on the size of the containers or cartons to be filled by the operator, the number of goods per group can be fixed in such a way that the overall length of the group in the X-direction can be received by the packaging. In order to ensure that in each case not more than the permissible number of goods are fed to the first collecting zone, a suitable blocking mechanism can be arranged in the product stream upstream of the first collecting zone, which blocking mechanism shuts off the further passage after passing of the suitably detected predefined number of goods, until the group which is formed in the first collecting zone has been displaced into the second collecting zone.

As an alternative, the number of goods per group can also be fixed automatically by way of the maximum available extent of the first collecting zone in the X-direction, with consideration of the length of each individual good in said direction. The length of the goods can be detected once or multiple times at predefinable instants, for instance at the start of production, in order to determine the permissible number of goods per group in a manner which is dependent thereon and on the available length of the first collecting zone. Both the length in the X-direction and the width in the Y-direction of the individual goods and/or each group can be detected by way of suitable sensors and can be determined and processed in a control unit which is coupled to the sensors.

Certain embodiments of apparatuses described herein can be distinguished by the fact that the push arm can be actuated with respect to a variable stroke H in such a way that a group which is formed in the first collecting zone assumes a predefined position Ytemp in the second collecting zone, said predefined position corresponding to the target position Ymax or a position which lies between the target position Ymax and the first collecting zone. The stroke which can be predefined for each displacement operation in a variable manner ensures that, at every time, the oldest group assumes the target position Ymax or is moved toward there by the displacement operation.

The first collecting zone expediently lies at the same vertical level as the second collecting zone, with the result that the groups can be displaced readily in the horizontal direction without a vertical offset. Embodiments described herein are not restricted, however, to a horizontal displacement of this type of the groups. The principle of group displacement along other directions in space is also conceivable; it would have to be ensured by way of suitable aids that the displaced groups maintain their position in space.

The embodiment with two collecting regions which lie opposite one another accordingly provides that the push arm can be moved over the first collecting zone to both sides, in order for it to be possible to arrange and provide groups in each collecting region. Here, suitable sensors detect the position of the push arm in the positive and in the negative Y-direction, in an analogous manner to the embodiment with only one collecting region on one side of the first collecting zone.

Before the formation of a new group in the first collecting zone, the direction of the next displacement operation already has to be fixed if two collecting regions which lie opposite one another are provided, since the push arm has to be positioned accordingly on the one or other side of the group to be newly formed, before said group is assembled and therefore prevents a movement of the push arm onto the other side of the group. In order to bypass this problem and to achieve even more freedom in the control of the displacement operations, a further advantageous embodiment provides to move the push arm in the region of the first collecting zone at a different vertical level than that on which the groups are newly formed. The push arm might be moved from the one to the other side of the collecting zone above or below the first collecting zone, with the result that said moving operation can take place independently of whether individual goods or all goods of a group to be formed are already available in the first collecting zone. Here, a suitable slotted guide mechanism can ensure that the push arm is raised up or lowered during a movement in the direction of the first collecting zone, in order to be moved onto the other side of the collecting zone. If, in contrast, the push arm is to displace a group out of the first collecting zone, it can be ensured by way of suitable electromechanical components that the push arm is then moved through the first collecting zone at the level of said first collecting zone, in order to load and to displace the group which is positioned there.

In the following text, one embodiment will be explained in greater detail using one example in the figure:

Here, the only FIG. 1 shows a diagrammatic plan view of the arrangement of a grouping apparatus with only single-sided operation. Here, the goods or groups are all arranged in a single collecting region.

Figure 2:
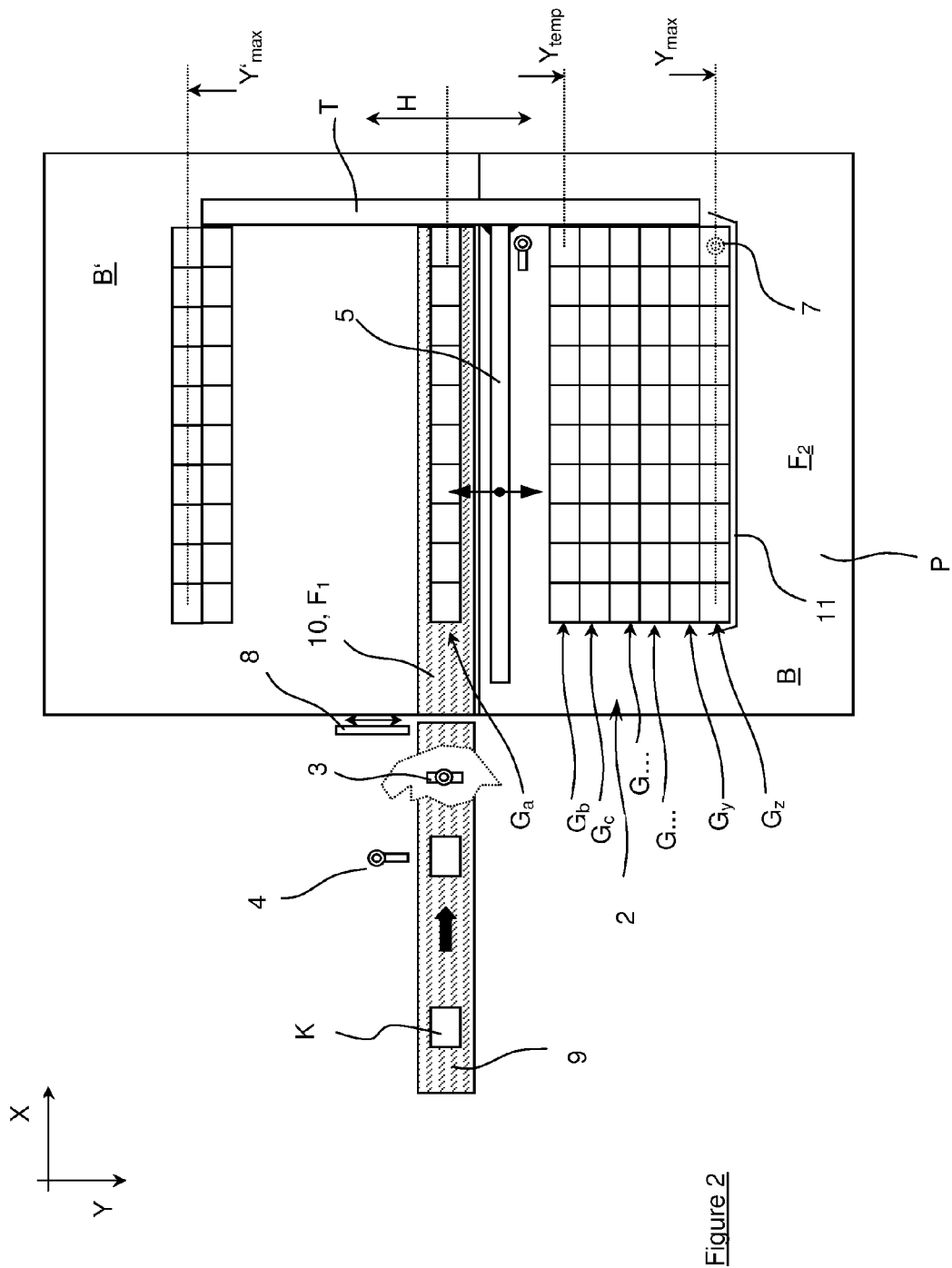
FIG. 2 shows a variant of a grouping apparatus, in which displacement can be carried out selectively to both sides of the first collecting zone.

FIG. 2 shows a variant, in which displacement can be carried out selectively to both sides of the first collecting zone.

As viewed from above, the apparatus according to FIG. 1 comprises a horizontally oriented packing table P with a largely flat surface F2. A plurality of groups Gb . . . z of goods K are situated on the packing table, which groups Gb . . . z are to be raised up from the packing table and are to be moved into a packaging V which is indicated next to it, which is to take place by way of the operator R.

The packing table P contains a transport belt 10 which can be detached from it with a surface F1 which adjoins the surface F2 of the packing table in a manner which neighbors said surface F2 in the horizontal direction Y. The transport belt 10 extends substantially in a likewise horizontal direction X which is perpendicular with respect to the direction Y.

A feed belt 9 is arranged adjacently in the X-direction with respect to the transport belt 10, via which feed belt 9 individual goods K are provided individually from a production line which is not shown in greater detail. The feed belt 9 delivers in the direction of the indicated arrow, with the result that the goods K are transferred one after another onto the transport belt 10 which moves at an adjustable speed. The transport speed of the transport belt 10 is preferably selected to be somewhat higher than that of the feed belt 9, in order to avoid product jams in the transfer region. Counting of the goods K which are transferred onto the transport belt 10 can also be performed in an easier manner if the transport belt 10 runs somewhat more rapidly than the feed belt 9, since the spacing of the goods increases in the X-direction during the transfer. Here, a blocking mechanism 8 can be moved into and out of the delivery path in the Y-direction at the end of the feed belt 9 in such a way that the transfer of goods K to the transport belt 10 can be suppressed and allowed as required. Two sensors 3, 4 are arranged above and to the side of the feed belt 9, in order to detect the length of the goods K in the X-direction and their width in the Y-direction and to signal this to a control unit 6. The sensors 3, 4 can also be arranged at a different position of the apparatus which is shown, for example also at the transport belt 10 or a machine which is connected upstream or lies upstream in the production stream. As an alternative or in addition, a sensor 3' for detecting the width in the Y-direction can also be arranged in the region of the second collecting zone.

The delivery path of the transport belt 10 in the X-direction is adjusted by way of the carrier T of a push arm 5, which carrier T forms a stop, with the result that the goods K which pass on the transport belt 10 as far as the carrier arm T pile up behind one another in the X-direction and in the process form a group Ga. In the example which is shown, the group Ga comprises 10 goods K which were gradually transferred from the feed belt 9 onto the transport belt 10 and have piled up there one behind another. The transport belt 10 therefore forms a first collecting zone 1, in which a predefinable number of goods is arranged to form a group Ga. After the feed of a number m of fed goods K which is desired or can be determined by way of the control unit 6, the further feed can be temporarily shut off via the blocking mechanism 8, if the group Ga is not discharged in time from the first collecting zone.

The latter takes place with the aid of the push arm 5 which can be moved along the carrier T in the horizontal Y-direction which is perpendicular with respect to the X-direction, in such a way that it loads the entire group Ga with a pushing force in the Y-direction by way of a front edge which faces the operator R and displaces them onto the surface F2 which is adjacent to the collecting zone 1 and represents a second collecting zone 2 for groups which are displaced in this way. To this end, the push arm 5 is actuated by a control unit 6 and is displaced in the direction Y with a variable stroke H which can be fixed individually for each displacement case. The controller can be part of the apparatus itself or can be integrated completely or partially into an external superordinate controller.

As a result of the repeated displacement of groups which are produced one after another out of the first collecting zone into the second collecting zone, a matrix-like arrangement of goods K can be produced which lie behind one another in the Y-direction in a plurality of groups on the packing table P. In order to facilitate moving of the individual groups into the packaging V by the operator R, certain embodiments of methods described herein ensure that the oldest group Gz always assumes a target position Ymax which lies closest to the user R or is displaced by way of the next displacement operation until in said position. Here, a sensor 7 which is let into the surface F2 of the packing table P detects whether the position Ymax has already been occupied by goods of a group or (for instance because the user R has shortly before removed a group from said position) the next youngest group has to be displaced toward there.

In the example which is shown, an oldest group Gz lies in the target position Ymax and accordingly covers the sensor 7. The youngest group Ga which is formed completely in the meantime in the first collecting zone 1 has to be displaced into the second collecting zone 2 or onto the packing table P, in order to make it possible to build the next following group in the first collecting zone 1. The next oldest group Gb with respect to the group Ga to be displaced currently has previously been displaced onto a temporary position Ytemp which is determined and possibly stored in the control unit 6. If the oldest group Gz still remains in the target position Ymax and secondly the second collecting zone 2 still has storage space for further groups, the group Ga can be transferred by way of the push arm 5 into the second collecting zone 2 in such a way that it bears against its next oldest group Gb, without displacing the latter (and therefore all further older groups). If the result of the determination of the stroke H which is required for the next displacement (which is performed in the control unit 6) is that the storage space in the collecting zone 2 is no longer sufficient, the displacement of the youngest group out of the first collecting zone 1 is suppressed; if necessary, the feed of further goods K into the first collecting zone 1 also has to be suppressed via the blocking mechanism 8.

If the operator R removes the oldest group Gz from the packing table P, it is ensured that the next youngest group Gy which has become the oldest on the packing table as a result is displaced into the advanced target position Ymax. Aware of said requirement, the control unit 6 accordingly actuates the drive (not shown) of the push arm 5 during the displacement of the next group Ga out of the first collecting zone 1 in such a way that said group Ga again bears against its next oldest group Gb which is already arranged in the second collecting zone after the displacement, and then displaces all groups of the second collecting zone further. Here, the further displacement is carried out in a stroke by at least one Y-width of a group, but always until the currently oldest or foremost group again assumes the target position Ymax. The stroke which is to be carried out in each case therefore depends on the filling degree of the second collecting zone.

At the start of production or if the second collecting zone is empty, the first group which is formed in the first collecting zone 1 which is then at the same time the oldest is displaced via the maximum stroke as far as into the target position Ymax. If the operator R removes said (oldest) group before the following displacement operation for the next youngest group is ended, said new group is also accordingly displaced as far as the target position. If the removal of the respectively oldest group takes place more slowly than the provision of younger groups, the younger groups are lined up behind one another in the Y-direction according to age, in order to be displaced further during following displacement operations together with at least one younger group if the target position becomes free in the meantime.

A formatting aid 11 at the target position can serve to assemble or align the goods K of the group which are provided there in an even more improved manner, in order for it to be possible to insert them into the packaging V more easily. The formatting aid 11 can have a stop and/or depression on or in the surface F2, against which the goods K are aligned automatically when assuming the target position, by being tilted, for example, obliquely forward by an amount together as a group, in order to be even easier to grip.

A supporting roller (not shown) at that free end of the push arm 5 which faces away from the carrier T supports said push arm 5 in the vertical direction and avoids high bending forces in the carrier T as a result. Furthermore, a maximum vertical gap between the underside of the push arm and the upper side of the packing table of, for example, 5 mm can be set by way of the roller and the carrier T, in order to rule out a risk of crushing and clamping for the operator.

The monitoring and evaluation of the data of the sensors 3, 4 and 7 takes place by way of the control unit 6 which can also assume further control functions which are not shown in greater detail or are described. The position detection of the push arm 5 can take place by means of an encoder, it being possible for the data therefrom to likewise be processed by the control unit. The actuation of the push arm for movement to a defined Y-position can also take place via said control unit.

A panel 12 which can be folded upward out of the X-Y plane permits the facilitated allround access to the transport belt 10 which is installed in the apparatus and its drive components, in order for it to be possible to remove them or the entire belt out of the apparatus easily and to maintain or replace them. To this end, the panel 12 can be released from a latched operating position or can be latched into said operating position, for example, via a manually actuable unlocking mechanism.

FIG. 2 shows a variant embodiment, in which the displacement of the groups takes place into two collecting regions B, B' which lie opposite one another. Here, the packing table P extends on both sides of the first collecting zone 1 (this, like some other elements, is not identified by designations again in FIG. 2 for reasons of clarity). A further, second collecting region B' therefore lies on the other side of the first collecting zone 1 opposite the first collecting region B which is arranged below the first collecting zone 1 in FIG. 1. Here, the push arm 5 is configured along the extended carrier T in such a way that, actuated by way of a suitable control unit, it can be moved to both sides of the first collecting zone 1, that is to say in the positive and negative Y-direction. Accordingly, the groups which are formed in the first collecting zone 1 can be displaced selectively into the first or second collecting region B, B'. The principle according to which an oldest group is to be displaced in each case as far as a target position, is also pursued accordingly for the variant with two collecting regions B, B'. Accordingly, the target position Y'max is situated in the region of the second collecting zone B', where it is fixed by way of sensors which are not shown in greater detail. As a result of the utilization of both collecting regions W, B' on both sides of the collecting zone 1, the packing table can therefore advantageously be utilized for a larger number of groups. The system of the group arrangement which is described for FIG. 1 also applies analogously for the positioning of the groups in the second collecting region B' according to FIG. 2.

Depending on the number of groups which are positioned in the individual collecting regions, a plurality of groups which are formed directly behind one another in the first collecting zone 1 can also be moved into one and the same collecting region B or B' by way of suitable actuation of the push arm 5. The push arm 5 is to be moved to this end onto the suitable side of the first collecting zone before the formation of a new group in the first collecting zone 1, in order for it then to be possible to displace the new group in the suitable direction. If the fixing of the displacement direction for a new group is to take place only after said new group has been formed in the first collecting zone 1, the push arm 5 can be moved from the first into the second collecting region or back in the region of the first collecting zone 1 at a different vertical level below or above the newly formed group according to one advantageous embodiment, in order to first of all position the arm expediently. The subsequent displacement operation then again takes place by way of a movement of the push arm 5 out of the first collecting zone 1 at the vertical level of the newly formed group which is to be displaced.

A slotted guide which is arranged, for example, within the carrier T and can be connected if required might realize the movement of the push arm 5 in the above-described way.

LIST OF DESIGNATIONS

| | |
|---|---|
| 1 | First collecting zone |
| 2 | Second collecting zone |
| 3, 3' | Sensor for detecting the width in the Y-direction |
| 4 | Sensor for detecting the length in the X-direction |
| 5 | Push arm |
| 6 | Control unit |
| 7 | Sensor for group detection at the target position |
| 8 | Blocking mechanism |
| 9 | Feed belt |
| 10 | Transport belt |
| 11 | Formatting aid |
| 12 | Panel |
| V | Packaging |
| B | First collecting region |
| B' | Second collecting region |
| R | Operator |
| P | Packing table |
| K | Goods item |
| F1, F2 | Surface |
| H | Stroke |
| T | Carrier |
| $Y_{temp}$ | Intermediate position |
| $Y_{max}$ | Target position |
| G | Group |
| $G_a$ | Youngest group |
| $G_z$ | Oldest group |

What is claimed is:

1. An apparatus for displacing discrete groups of goods, the apparatus comprising:
    a packing table, the packing table comprising:
        a first collecting zone, to which goods can be fed from a serial production stream, in order to arrange them in series in a first direction in the first collecting zone and to combine them to form a group, and
        a second collecting zone, into which each individual group can be displaced out of the first collecting zone by way of a stroke, in order to empty the first collecting zone for forming a new group;
    a first sensor for determining a width of a good within the first collecting zone;
    a second sensor for monitoring occupation of a target position in the second collecting zone; and
    a movable push arm for displacing each group out of the first collecting zone in the direction into the second collecting zone, which push arm can be actuated by a control unit to perform a variable stroke, the length of the variable stroke being based at least in part on the determined width of a good within the first collecting zone.

2. A method for displacing discrete groups of goods towards a predefinable target position on a packing table, the method comprising,
    combining the goods one after another from a serial production stream to form groups, by in each case a predefinable number of goods being fed to a first collecting zone in such a way and being kept available there in such a way that the goods lie behind one another in a first direction as a group, it being intended for the group to be considered to be older in comparison with a group to be formed subsequently and to be younger in comparison with a group which has already been formed; and displacing each individual group directly one after another by a stroke in a second direction which runs perpendicularly with respect to the first direction into a second collecting zone, in order to empty the first collecting zone for forming a new, younger group, wherein each stroke is variable and is selected in such a way that the group or the oldest group is displaced to a predefinable target position if there was previously no older group there, or such that the group is pushed as far as its next oldest group if there is already an oldest group at the target position, and wherein occupation of the target position is monitored by at least one sensor.

3. The method as claimed in claim 2, wherein each older group is displaced indirectly by virtue of the fact that a younger group which adjoins it directly is for its part displaced indirectly or directly.

4. The method as claimed in claim 2, wherein the width of the goods in the direction is detected by at least one suitable sensor and is used to determine the necessary stroke.

5. The method as claimed in claim 2, wherein the displacement of the groups takes place by means of a movable push arm, the respective current displacement position of which is detected in the direction.

6. The method as claimed in claim 2, wherein, during the displacement of the group from the first into the second collecting zone, the stroke is selected to be greater at least by a predefinable amount than the clear width of the goods in the direction.

7. The method as claimed in claim 2, wherein the maximum number of groups which are to be kept available in the second collecting zone is predefined manually or is determined automatically with consideration of the width of the goods in the direction and the target position.

8. The method as claimed in claim 2, wherein the maximum number of goods per group is fixed by way of:
a) stipulation of a freely selected value, preferably by manual input into an operating interface of a control unit, or
b) automatic determination or manual stipulation of the length of the individual goods in the direction by means of a sensor and determination of the number of lengths of this type which fit on the first collecting zone in the direction.

9. The method as claimed in claim 2, wherein the second collecting zone has two collecting regions which are separated from one another in the direction by the first collecting zone, each group which is formed in the first collecting zone optionally being displaced into the first or second collecting region by the stroke taking place in the positive or negative direction.

10. The method as claimed in claim 9, wherein the groups which are formed in the first collecting zone are always displaced alternately into the first and second collecting region.

11. The method as claimed in claim 9, wherein a movable push arm, by way of which the groups are displaced, is positioned, after a group has been displaced into the first or second collecting region, on that side of the first collecting zone which faces said collecting region at least until the next group which is provided for displacement into the other, second or first collecting region is completely assembled in the first collecting zone.

12. The method as claimed in claim 9, wherein always only so many groups are collected in both collecting regions that a push arm which moves the groups can be moved without displacing a group from one into the other collecting region.

13. An apparatus for displacing discrete groups of goods, the apparatus comprising:
a packing table, the packing table comprising:
a first collecting zone, to which goods can be fed from a serial production stream, in order to arrange them in series in a first direction in the first collecting zone and to combine them to form a group, and
a second collecting zone, into which each individual group can be displaced out of the first collecting zone by way of a stroke, in order to empty the first collecting zone for forming a new group;
a movable push arm for displacing each group out of the first collecting zone in the direction into the second collecting zone, which push arm can be actuated by a control unit to perform a variable stroke in such a way that, after the displacement, the group assumes a predefined position in the second collecting zone; and
at least one sensor configured to detect occupation of a target position in the second collecting zone.

14. The apparatus as claimed in claim 13, further comprising means for the automatic determination of the width of the goods in the direction, in order for it to be possible to take this into consideration during the establishing of the necessary stroke.

15. The apparatus as claimed in claim 13, wherein the first collecting zone has a substantially flat surface for bearing the grouped goods, which flat surface is flush with a substantially flat surface of the second collecting zone, onto which the groups are displaced, or can be raised or lowered into said flush position by way of relative movement of the two surfaces.

16. The apparatus as claimed in claim 13, wherein an automatically acting blocking mechanism is provided which prevents the further feed of goods into the first collecting zone until a complete group which is present there has been displaced into the second collecting zone.

17. The apparatus as claimed in claim 13, characterized in that the second collecting zone has two collecting regions which are separated from one another in the direction by way of the first collecting zone, it being possible for each group which is formed in the first collecting zone to be optionally displaced into the first or second collecting region, by the stroke taking place in a positive or negative direction.

18. The apparatus as claimed in claim 17, wherein the push arm can be moved at a height level which is different from the first collecting zone from the first into the second collecting region or back in such a way that a group can be assembled in the first collecting zone during this.

* * * * *